US011628621B2

(12) United States Patent
Pieger et al.

(10) Patent No.: US 11,628,621 B2
(45) Date of Patent: Apr. 18, 2023

(54) METHODS AND SYSTEMS FOR MEASURING BASE ELEMENTS OF A CONSTRUCTION CYLINDER ARRANGEMENT

(71) Applicant: TRUMPF Laser-und Systemtechnik GmbH, Ditzingen (DE)

(72) Inventors: Markus Pieger, Wendlingen am Neckar (DE); Frederik Schaal, Fellbach (DE); Simon Dambach, Stuttgart (DE); Valentin Blickle, Stuttgart (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 342 days.

(21) Appl. No.: 16/864,286

(22) Filed: May 1, 2020

(65) Prior Publication Data

US 2020/0263978 A1     Aug. 20, 2020

Related U.S. Application Data

(63) Continuation of application No. PCT/EP2018/078426, filed on Oct. 17, 2018.

(30) Foreign Application Priority Data

Nov. 3, 2017   (DE) .......................... 102017219559.2

(51) Int. Cl.
*B29C 64/245*   (2017.01)
*B33Y 30/00*   (2015.01)
(Continued)

(52) U.S. Cl.
CPC ............ *B29C 64/245* (2017.08); *B22F 10/28* (2021.01); *B22F 10/31* (2021.01); *B22F 12/13* (2021.01);
(Continued)

(58) Field of Classification Search
CPC ............ G01B 11/2518; G01B 11/0608; G01B 11/254; B33Y 30/00; B33Y 40/00;
(Continued)

(56) References Cited

U.S. PATENT DOCUMENTS 6,594,006 B1 †   7/2003   Muehlhoff
8,040,530 B2     10/2011   Cooper
(Continued)

FOREIGN PATENT DOCUMENTS

CN   101821081 A   9/2010
DE   4431922 A1 †   5/1996
(Continued)

OTHER PUBLICATIONS

Translation of DE102015211538A1 (Year: 2015).*
(Continued)

*Primary Examiner* — George R Koch
(74) *Attorney, Agent, or Firm* — Fish & Richardson P.C.

(57) ABSTRACT

The disclosure provides methods and systems for measuring a base element of a construction cylinder arrangement in machines for the additive manufacture of 3D objects using a high-energy beam, wherein a measurement pattern is produced from laser light that illuminates the base element, and sites of incidence of the laser light are monitored and evaluated with a camera to produce measuring data about the base element, e.g., position information, orientation information, and/or information about the shape of the surface of the base element. The measurement patterns are produced by deflecting measuring laser beams by an optical scanner system towards the base element, and the camera is arranged laterally offset from the deflected laser beams. The new methods and systems enable measuring base elements in a simple and flexible manner, and require only a small amount of space in the processing chamber.

18 Claims, 7 Drawing Sheets

(51) Int. Cl.
*B33Y 50/02* (2015.01)
*B29C 64/153* (2017.01)
*B29C 64/393* (2017.01)
*B28B 1/00* (2006.01)
*G01B 11/06* (2006.01)
*G01B 11/25* (2006.01)
*B33Y 40/00* (2020.01)
*B33Y 10/00* (2015.01)
*B22F 10/28* (2021.01)
*B22F 12/13* (2021.01)
*B22F 12/45* (2021.01)
*B22F 12/49* (2021.01)
*B22F 12/90* (2021.01)
*B22F 10/31* (2021.01)
*B22F 12/41* (2021.01)
*B22F 12/44* (2021.01)
*B22F 10/38* (2021.01)

(52) U.S. Cl.
CPC .............. *B22F 12/45* (2021.01); *B22F 12/49* (2021.01); *B22F 12/90* (2021.01); *B28B 1/001* (2013.01); *B29C 64/153* (2017.08); *B29C 64/393* (2017.08); *B33Y 10/00* (2014.12); *B33Y 30/00* (2014.12); *B33Y 40/00* (2014.12); *B33Y 50/02* (2014.12); *G01B 11/0608* (2013.01); *G01B 11/254* (2013.01); *G01B 11/2518* (2013.01); *B22F 10/38* (2021.01); *B22F 12/41* (2021.01); *B22F 12/44* (2021.01)

(58) Field of Classification Search
CPC ..... B33Y 50/02; B29C 64/153; B29C 64/245; B29C 64/393; B22F 10/20; B22F 10/30; B28B 1/001
See application file for complete search history.

(56) References Cited

U.S. PATENT DOCUMENTS

| | | | |
|---|---|---|---|
| 9,484,188 B2 | 11/2016 | Vergeer | |
| 2016/0023403 A1 | 1/2016 | Ramos et al. | |
| 2017/0120337 A1 | 5/2017 | Kanko et al. | |
| 2017/0205623 A1* | 7/2017 | Small | G02B 26/105 |
| 2018/0133800 A1† | 5/2018 | Pieger | |

FOREIGN PATENT DOCUMENTS

| | | |
|---|---|---|
| DE | 102008049821 A1 | 4/2010 |
| DE | 102012106613 B3 | 12/2013 |
| DE | 102014222159 A1 | 5/2016 |
| DE | 102015211538 A1 | 12/2016 |
| DE | 102016106403 A1 | 10/2017 |
| EP | 2905592 A1 | 8/2015 |
| EP | 2942130 A1 | 11/2015 |
| TW | 201643554 A | 12/2016 |
| WO | WO 2016/207258 A1 | 12/2016 |
| WO | WO 2017/187147 A1 | 11/2017 |
| WO | WO 2019/086250 A1 | 5/2019 |

OTHER PUBLICATIONS

CN Office Action in Chinese Appln. No. 201880071678.5, dated Mar. 2, 2022, 11 pages (with English translation).
DE Office Action in German Appln. No. DE 102017219559, dated Jun. 11, 2018, 11 pages (with English translation).
PCT International Preliminary Report on Patentability in International Appln. No. PCT/EP2018/078426, dated May 5, 2020, 17 pages (with English translation).
PCT International Search Report and Written Opinion in International Appln. No. PCT/EP2018/078426, dated Dec. 13, 2018, 22 pages (with English translation).

\* cited by examiner
† cited by third party

METHODS AND SYSTEMS FOR MEASURING BASE ELEMENTS OF A CONSTRUCTION CYLINDER ARRANGEMENT

CROSS REFERENCE TO RELATED APPLICATIONS

This application is a continuation of and claims priority under 35 U.S.C. § 120 from PCT Application No. PCT/EP2018/078426, filed on Oct. 17, 2018, which claims priority from German Application No. 10 2017 219 559.2, filed on Nov. 3, 2017. The entire contents of each of these priority applications are incorporated herein by reference.

TECHNICAL FIELD

The disclosure relates to methods for measuring a base element, e.g., a substrate or a preform, of a construction cylinder arrangement in a machine for the additive manufacturing of three-dimensional objects.

BACKGROUND

The additive manufacturing of three-dimensional objects by means of sintering or melting using a high-energy beam, e.g., a laser beam or electron beam, makes it possible to manufacture object geometries that are not accessible using conventional techniques (which are based, for example, on a casting process or milling a solid body).

Here, a thin layer of a powdery material is applied to a base element, usually a substrate (also called construction platform) or a preform, in a construction cylinder (also called construction chamber) and then heated at selected locations using a high-energy beam until the powdery material melts or sinters. The base element is then lowered by an associated piston part in the construction cylinder by a layer thickness of the powder, another layer of the powdery material is applied and again heated at selected locations by the high-energy beam, and so on. The construction cylinder is fastened to a connection of a processing chamber.

The base element must be aligned in the construction cylinder for good manufacturing accuracy. In particular, preheating the powdery material can lead to deformation, in particular tilting, of the base element in the construction cylinder or relative to the rest of the processing chamber.

WO 2016/207258 A1 discloses a construction cylinder arrangement in which a substrate is fastened to an upper piston part, which is detachably fastened to a middle piston part. The middle piston part is, in turn, arranged on a lower piston part and can be aligned with the latter by means of three adjusting elements. Furthermore, a measuring device is provided, wherein three laser diodes each generate a laser line at an oblique angle at different locations on a gap between a reference surface, for example, a processing chamber floor, and the substrate, and wherein a camera system detects the various locations individually. The beam path of a camera is directed through a scanner optical system of the machining laser beam, the scanning position of the camera being switched over using the scanner optical system. The scanner optical system is arranged centrally above the substrate.

Using the measuring device, an offset of laser line parts at the gap can be recognized, and thereby a tilt of the substrate can be determined and corrected by means of the adjusting elements. However, the arrangement of the three laser diodes requires a relatively large amount of installation space in the processing chamber. The laser diodes must be specially aligned for the type of construction cylinder used, which means that this procedure is complex and inflexible when setting up. The information available with the laser diodes is also limited.

DE 10 2016 106 403 A1 discloses a method for the calibration of a scanning system of a laser sintering or laser melting system, in which a line pattern is generated by a scanning system on a surface in the plane of a construction field.

SUMMARY

The disclosure provides methods and systems for measuring a base element, e.g., a substrate or a preform, of a construction cylinder arrangement, wherein the construction cylinder arrangement is arranged in a machine for the additive manufacturing of three-dimensional objects by sintering or melting a powdery material using a high-energy beam, in which the base element can be moved by means of a piston in a substantially cylindrical base body of the construction cylinder arrangement, e.g., wherein the piston has an upper piston part, on which the base element is arranged, and a lower piston part, against which the upper piston part can be aligned by means of at least two, e.g., three, adjusting elements, wherein a measurement pattern is produced from laser light that illuminates at least part of the base element, for measuring the base element, and sites of incidence of the laser light are monitored, e.g., observed, and evaluated with a camera, resulting in the determination of measuring data about the base element, comprising position information, and/or orientation information, and/or information about the three-dimensional shape of at least part of the surface of the base element.

The methods and systems of the present disclosure can be used in a flexible manner for measuring a base element and require only a small amount of space in the processing chamber.

The new methods are characterized in that the measurement pattern is generated from laser light by deflecting a laser beam of a measuring laser by a scanner optical system, so that differently deflected laser beams are generated, and the deflected laser beams are directed at least towards the part of the base element, and that the camera is arranged in a laterally offset manner in relation to the deflected laser beams.

In some embodiments of the present disclosure, the scanner optical system is used to steer a laser beam in rapid succession in different directions and thus generate differently deflected laser beams. These differently deflected laser beams can be used for measuring the base element, for example in the scope of a triangulation measurement.

Using the scanner optical system, different measurement patterns can be generated depending on the application or measurement task, wherein only the control of the scanner optical system is changed (reprogrammed). In particular, no structural changes to the hardware are required to change the measurement pattern. An adaptation of the measurement pattern to a(n) (expected) geometry of a base element, such as a preform, is possible without any problems, for example, by inputs on the control software. Measuring data relating to base elements can be determined flexibly, in particular positions, for example height positions, or tilting, or three-dimensional structures (for example preforms or layer measurements). The measuring data obtained can be used to correct the position and/or orientation of the base element before the start of manufacturing of a three-dimensional object, and/or to adapt a subsequent process of the additive manufacturing of a three-dimensional object at the determined position, orientation, and/or shape of the base element.

In addition, only a single measuring laser is required for generating the measurement pattern, even if deflected laser beams are required at different locations on the base element (for example, at three locations that are distributed in the peripheral region of the base element in the circumferential direction). With the scanner optical system, the desired locations can be illuminated in quick succession. During this illumination, the camera can take an integral image recording covering all of the desired locations; alternatively, it is also possible to take an individual image with the camera for different locations (or for respective partial measurements).

The measurement pattern can be limited to the base element or a part thereof, or additionally illuminate parts of a reference structure (which is stationary in the machine and, for example, does not move with the piston).

The measuring laser can be arranged in the processing chamber or outside the processing chamber, so that little or no installation space is required in the processing chamber for the measuring laser. The scanner optical system can also be arranged inside or outside the processing chamber.

The lateral offset of the camera (or the image-capturing camera lens) relative to the respective deflected laser beam means that a shift in the site of incidence of the deflected laser beam in the direction of beam propagation leads to a shift in the image of the site of incidence in the image plane of the camera. As a result, the local height of the base element (measured mostly vertically, substantially along the deflected laser beam) can be determined.

A target image ("calibrated zero position") is typically stored in an evaluation device for a specific measurement pattern, and the measurement information on the base element (for example a tilt or a height position) is determined from the deviations of a measured image of the camera from the target image. To improve the measurement accuracy (in particular, repeatability), a plurality of measurements can be carried out and an average measurement result can be determined.

The measuring laser is typically a separate laser that is used for measuring only the base element. Alternatively, a pilot laser or a machining laser can also be used as the measuring laser. The measuring laser can be power-stabilized (for example, to a maximum of 5% power fluctuation or better) to achieve a good measuring resolution. The measuring laser can have a reduced coherence (for example with a 10 nm bandwidth or better, i.e., even higher bandwidth), which reduces the so-called laser speckle and thereby also improves the measurement resolution. The laser wavelength of the measuring laser can be in the visible spectral range, for example, in the red spectral range (around 650 nm).

High measurement resolutions (position resolutions) are possible within the scope of the present disclosure. Typically, the camera and measuring laser are set up in such a way that a measurement resolution of 100 µm or better, e.g., 50 µm or better, or 15 µm or better, is achieved. The measurements are reliable, robust, and fast (no artefacts due to powder application, no iterative coating necessary); the measurements do not require any coatings or powder wear (e.g. due to oxidation).

In some embodiments of the methods disclosed herein, measuring the base element also determines at least also a tilting of the base element relative to a reference structure. As a result, a type of deformation that is common during preheating of the powdery material can be detected, which allows a corresponding correction. The reference structure is stationary in the machine, such as the bottom of a processing chamber. Note that the reference structure does not necessarily need to be illuminated by the measurement pattern.

An advantageous further development of this embodiments provides that the measurement pattern includes illumination of at least part of the base element in three different zones. This allows easy determination of the tilt (i.e., two tilt angles) without further assumptions. One measuring point is sufficient for each zone. Usually, however, a plurality of measuring points per zone are evaluated. As an alternative to this embodiment, it is also possible, for example, to lay two lines over the base element and to determine their distance from the respective target lines; however, the measurement pattern can also include more than two lines. It is also possible to use polylines or more complex, e.g. curved, patterns instead of lines.

In some embodiments, the locations of at least two, e.g., three, of the zones substantially correspond to the locations of adjusting elements with which the base element can be tilted relative to the reference structure. This makes the control (or software) for the adjusting elements particularly simple.

In some embodiments the measurement pattern in each of the three zones includes a plurality of laser points, e.g., a laser line in each case. Noise can be reduced by averaging using a plurality of laser points. In addition, moving a laser point along a line reduces speckle patterns. In general, a plurality of laser points or a laser line (moving laser point) can be used for determining individual measurement information about the base element.

In other embodiments, the measurement also includes at least a three-dimensional determination of at least part of a surface of the base element, in particular of the preform. The scanner optical system also makes it possible to scan the surface of a base element and thus determine or check its shape. Defective or deformed base elements can be recognized and sorted out. It is also possible to make corrections for the subsequent additive application of material and, for example, only to add powdery material later in the case of material protrusions, or to add powdery material beforehand in the case of material recesses.

An advantageous further development provides that the measurement pattern includes a line-by-line scan of at least the part of the surface of the base element, a plurality of individual images being taken with the camera during the line-by-line scan. This procedure also allows larger parts of the surface to be captured in a simple manner. An overall measurement or overall information can then be put together from the individual recordings (images).

In some embodiments, the measurement at least also determines the height of the base element relative to a reference structure. This allows the height position to be corrected if necessary (for example by moving the piston in the base body) to ensure the correct focus position of the machining laser. Note that the measurement pattern does not necessarily have to illuminate the reference structure.

In additional embodiments for measuring the base element, the sites of incidence of the laser light on the base element monitored with the camera are compared with the expected sites of incidence of the laser light on the base element, e.g., wherein the measurement pattern illuminates only the base element and/or wherein only sites of incidence of the laser light on the base element are evaluated. In this embodiment, no reference structure needs to be illuminated.

This also allows a particularly reliable measurement of the base element; any soiling or errors in the reference structure are irrelevant.

Embodiments for Multiple Use of Machine Components

In other embodiments, the machines further include a machining laser, and after the measurement of the base element, then for manufacturing layers of at least one three-dimensional object on the base element, at least parts of layers of powdery material on the base element are illuminated with machining patterns made of laser light, wherein the machining patterns are generated by deflecting a laser beam of the machining laser by the scanner optical system. This means that the scanner optical system is used twice (for triangulation measurement and for machining), which makes the method particularly cost-effective, and the machine for additive manufacturing can be made particularly compact.

In some embodiments, after the base element is measured, layers of powdery material are applied on the base element for manufacturing layers of at least one three-dimensional object on the base element, wherein the layers of powdery material are optically checked with the camera before the high-energy beam is used. As a result, the camera is used twice (as a powder image camera and triangulation camera). This makes the method particularly cost-effective, and the machine for additive manufacturing can be made particularly compact.

Methods with Calibration Using a Measurement Sequence and a Reference Measurement Sequence with a Moving Base Element In other embodiments of the methods disclosed herein, the measurement pattern includes at least one triangulation point, wherein in a measurement sequence, sites of incidence of the at least one triangulation point are monitored, e.g., observed or imaged, at different travel positions of the base element in the base body using the camera, and associated measurement sequence data are obtained, wherein the triangulation point is generated by a deflected laser beam directed at the base element at a fixed angle during the measurement sequence, and the measurement sequence data are compared with reference measurement sequence data from a reference measurement sequence, wherein sites of incidence of the at least one triangulation point were also observed within the scope of the reference measurement sequence at different travel positions of a reference base element in the base body using the camera and the associated reference measurement sequence data were obtained, wherein the triangulation point was generated by a deflected laser beam, which was directed at the reference base element at a reference angle fixed during the reference measurement sequence, and wherein correction information for the measurement of the base element is derived from the comparison of the measurement sequence data and the reference measurement sequence data.

In particular, the correction information can be used to compensate for a pointing instability or drift of the measuring laser or the associated scanner optical system in the measuring system, which leads to errors in the position determination during triangulation, for example. The correction information can be, for example, a height offset in the area of a (respective) triangulation point; wherein such a height offset can be compensated for by a precise movement mechanism of the piston.

The travel axis of the construction platform is usually a very precisely adjustable axis. The specified procedure means that its precision (in particular when varying the height in the reference measurement) can also be used for the calibration of a machine for the additive manufacturing of three-dimensional objects or their measuring system. Different locations on the base element are usually (at least slightly) illuminated during the measurement sequence and the reference measurement sequence, as a result of which measurements, which are independent of speckle effects, are averaged. This can also improve the precision of the calibration or the associated additive manufacturing of a three-dimensional object. Typically, at least five, e.g., at least ten measuring points (travel positions), are measured per measurement sequence or reference measurement sequence.

In some embodiments, the reference measurement sequence is carried out once when a machine for additive manufacturing of three-dimensional objects is started up, and the measurement sequence is carried out at the start of a new construction job. Usually the measurement sequence and the reference measurement sequence use the same measurement pattern or at least similar measurement patterns; however, the measurement patterns can also be different. The comparison of the reference measurement sequence data and the measurement sequence data is typically carried out via parameters derived from the reference measurement sequence data and/or the measurement sequence data.

In some embodiments, the correction information is used to determine the position or orientation of the base element and, if necessary, to readjust the position or orientation to subsequently manufacture the three-dimensional object as accurately as possible.

In some embodiments, the measurement sequence data or part of it and the correction information can be used to directly obtain desired measuring data about the base element. However, it is also possible, after receiving the correction information, to carry out a further measurement of the base element as disclosed herein, for example, with a different measurement pattern, and to continue using the correction information in this measurement.

In another aspect, the disclosure features methods in which the measurement pattern includes at least three, e.g., at least four, triangulation points, e.g., where the triangulation points are designed as corner points of the measurement pattern, to which straight portions of the measurement pattern adjoin, e.g., wherein the triangulation points are formed as corner points of a rectangular measurement pattern. An orientation of the base element, for example, a tilt with respect to two axes, can be determined by means of three or more triangulation points. If desired, five or more triangulation points can also be provided. The determination of corner points of a measurement pattern is particularly easy and reliable by extrapolating straight portions using automatic image analysis software. When using a rectangular measurement pattern ("quadrilateral"), the determination of the position of the corner points is further simplified since the edges can be oriented along the pixel axis of the camera sensor.

In some embodiments, one or more curve parameters, e.g., hyperbolic parameters, are each determined from the measurement sequence data and the reference measurement sequence data, which in each case describe a curve, e.g., a hyperbolic curve, which is fitted to the sites of incidence observed as a function of the travel position of the base element in the base body. By fitting curves and using curve parameters, the speckle error is easily averaged out of the measuring data. The correction information can be determined using the curve parameters with increased accuracy. Hyperbolic curves are particularly suitable as fitted curves, because such a curve results from the geometry of the optical system. However, other types of curves can also be fitted in good approximation, for example, on the basis of a polynomial function.

In some embodiments, the correction information is determined from an offset of the curves of the measurement sequence data and the reference measurement sequence data. This procedure is particularly simple, and can be used particularly well if the measurable travel path of the base element in the base body (in the z direction) is relatively small (for example, with a travel path of less than 4 cm or a travel path of less than 1/12 of the mean distance to the camera entrance pupil), and/or if no significant differences between the reference angle of the laser beam in the reference measurement sequence and the angle of the laser beam in the measurement sequence are to be expected.

Alternatively, in certain embodiments, the respective fitted curve is a hyperbolic curve and the curve parameters are hyperbolic parameters, and a position ($z_P^M$, $z_P^R$) of a pole point of the respective hyperbolic curve is determined from the one or more hyperbolic parameters, and the correction information is determined from a comparison of the positions determined ($z_P^M$, $z_P^R$) of the pole points of the hyperbolic curves of the measurement sequence data and the reference measurement sequence data. In general, the position (x) of a triangulation point on an image plane of the camera is a function of the set travel position (z) of the base element according to a hyperbolic curve, with $x=P_0/(P_1+z)+P_2$, with $P_0$, $P_1$, $P_2$: Hyperbolic parameters.

The hyperbolic curve always has a pole at the entrance pupil of the camera lens; the position of the pole point is in particular independent of the set angle of incidence of the laser beam on the base element. The parameter $P_1$ describes the position of this pole point. Therefore, by comparing the positions of the pole points from the hyperbolic curves of the reference measurement sequence and the measurement sequence, a calibration can be carried out which also compensates for angular errors of the laser system (that is, a deviation between the reference angle and the angle of the measurement sequence). For example, in the reference measurement sequence, if the pole point/entrance pupil was at the travel position $z_P^R$ (corresponding to parameter $P_1$ of the hyperbolic curve of the reference measurement sequence), and if a desired position (relative to the fixed camera) of the reference base element or its surface was obtained in the reference measurement sequence at the set travel position $z_B^R$, and if furthermore the pole point/entrance pupil for the measurement sequence was obtained at the travel position $z_P^M$ (corresponding to parameter $P_1$ of the hyperbolic curve of the measurement sequence), then by setting a travel position $z_B^M$ according to $$z_B^M=(z_P^M-z_P^R)+z_B^R$$

the base element or its surface is obtained at the identical position (relative to the fixed camera) as in the reference measurement sequence with respect to the reference base element. A very precise calibration is possible with this procedure; typically, the measuring sequence and the reference measurement sequence are used to measure a relatively long travel path to be able to determine the hyperbolic parameters with high accuracy (for example over a travel distance of at least 4 cm or over a travel distance of more than 1/12 of the average distance to the camera entrance pupil).

In some embodiments, the fixed angle runs obliquely to a direction of travel of the base element in the base body. This ensures that the triangulation point moves noticeably relative to the surface of the base element during the measurement sequence, so that an averaging takes place which reduces speckle errors. The angle is typically 5° or more to the direction of travel. Similarly, the reference angle for the reference measurement sequence should also be selected oblique to the direction of travel of the base element in the base body.

In additional embodiments, the base element and the reference base element are constructed identically. This minimizes the correction quantities and contributes to a higher manufacturing accuracy.

Machines for the Additive Manufacturing of Three-Dimensional Objects

In another aspect, the disclosure also includes machines for the additive manufacturing of three-dimensional objects by sintering or melting powdery material using a high-energy beam, with a construction cylinder arrangement with a substantially cylindrical base body and a piston that can be moved in the base body and on which a base element, e.g., a substrate or a preform, is arranged, e.g., wherein the piston has an upper piston part, on which the base element is arranged, and a lower piston part, against which the upper piston part can be aligned by at least two, e.g., three, adjusting elements, and having a measuring system for measuring the base element by laser light, which determines measuring data about the base element, including position information, and/or orientation information, and/or information about the three-dimensional shape of at least part of the surface of the base element, wherein the measuring system for measuring the base element includes a scanner optical system, a measuring laser coupled to the scanner optical system, a control device which is set up to deflect a laser beam generated by the measuring laser by means of the scanner optical system in such a way that differently deflected laser beams are generated in accordance with a programmed measurement pattern, and the deflected laser beams are directed onto at least part of the base element, a camera with which sites of incidence of the laser beams deflected by the scanner optical system can be monitored, e.g., observed or imaged, and which is arranged laterally offset from all possible deflected laser beams, which could be directed onto the base element by the scanner optical system, and an evaluation device which is set up to evaluate the sites of incidence of the laser light monitored, e.g., observed or imaged, by the laterally offset camera of the measurement pattern generated with the scanner optical system and to determine therefrom the measuring data about the base element.

A compact construction is possible with the machine as described herein, in particular little or no installation space is required in the processing chamber for the measuring system. The measuring system is simple, particularly with regard to the installation, and can be used flexibly for different types of construction cylinder arrangements and base elements (substrates or preforms). The camera can be arranged in such a way that it is also laterally offset from possible laser beams that are directed by the scanner optical system onto a reference structure that surrounds the base element. Typical measuring data (measurement information) are data about a tilting of the base element, data about the height position of the base element, and/or data about the three-dimensional shape of at least part of the surface of the base element. The machines described herein are suitable for carrying out the methods described herein.

In some embodiments, the machines include a machining laser as a high-energy beam source, and the machining laser is likewise coupled to the scanner optical system. This means that the scanner optical system can be used twice, which is inexpensive and particularly compact.

An advantageous development of this embodiment provides that a beam splitter is arranged in the beam path in front of the scanner optical system, and the measuring laser and the machining laser are each aligned with the beam splitter. The beam splitter (typically a semi-transparent mirror, e.g., arranged at a 45° angle to the input and output beams) can be used to easily couple the measuring laser and machining laser to the same scanner optical system. The beam splitter and the scanner optical system, as well as the measuring laser and the machining laser, are typically located outside the processing chamber.

In another embodiment, the machines further include a test device which is set up to read out and evaluate recordings of the camera from a layer of powdery material applied to the base element before machining with the high-energy beam. As a result, the camera is used twice, which is inexpensive and particularly compact.

A further development of this embodiment provides that the scanner optical system or a focusing optical system downstream of the scanner optical system or a group of scanner optical systems, including the scanner optical system, or a group of focusing lenses downstream of this group of scanner optical systems, is arranged above the base element, e.g., is arranged centrally above the base element, and the camera is arranged in a horizontal direction next to the base element. Due to the arrangement above the base element (i.e., in the vertical direction above the base element and in alignment with the base element with respect to the horizontal direction), in particular (at least substantially) centrally above the base element, all parts of the base element can be easily reached using the scanner optical system or the focusing optical system by deflected laser beams; beam expansions of a deflected laser beam are minimized, which also allows good spatial resolution. Due to the arrangement of the scanner optical system or the focusing optical system above the base element and the arrangement of the camera next to the base element (and in the vertical direction above the base element, usually at a similar height to the scanner optical system), these are spaced apart from one another in the horizontal direction, and the camera is always arranged in a simple manner laterally offset from all possible deflected laser beams which could be directed onto the base element by the scanner optical system. There is usually sufficient space for the camera horizontally next to the base element in the processing chamber; alternatively, the camera can also be arranged outside the processing chamber behind a window.

Within the scope of the present disclosure, the measuring systems for measuring the base element can also include a plurality of scanner optical systems, each of which is coupled to the measuring laser or alternatively to a plurality of measuring lasers and which are controlled by the control device to generate the measurement pattern. In this case, more complex measurement patterns are possible, and shadowing can be avoided or minimized if necessary, especially when measuring the surface of preforms. If desired, a plurality of cameras can also be provided, each of which is arranged laterally offset from all possible deflected laser beams which could be directed onto the base element by respectively associated scanner optical systems; shadowing can also be avoided or minimized in this way. The group of these scanner optical systems or a group of focusing optical systems downstream of this group of scanner optical systems can be arranged above the base element, e.g., arranged centrally above the base element.

In some embodiments, the camera is designed as a camera with a shifted optical system. This avoids distortions in the recordings, especially with aberrant lines. Alternatively, for example, any distortions can be eliminated by calculation from the camera recordings using software.

Furthermore, the use of machines as described herein, in methods described herein, also fall within the scope of the present disclosure.

Further advantages of the methods and machines described herein will become apparent from the description and the drawings. Likewise, according to the disclosure, the above-mentioned features and those which are to be explained below can each be used individually for themselves or for a plurality of combinations of any kind. The embodiments shown and described are not to be understood as an exhaustive enumeration but rather are merely examples of the methods, machines, and systems disclosed herein.

DESCRIPTION OF DRAWINGS

The machines and methods described herein are illustrated in the drawing and are explained in more detail below.

DETAILED DESCRIPTION

Figure 1:
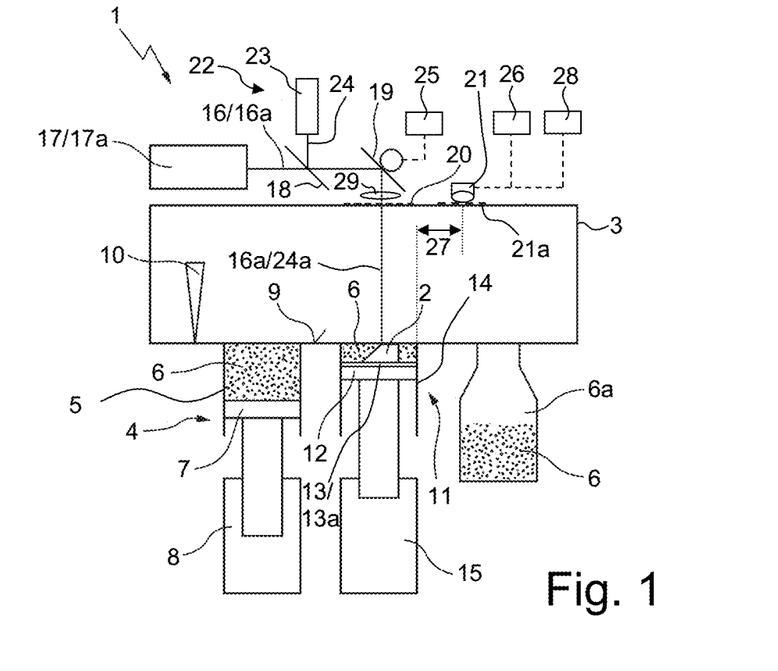
FIG. 1 is a schematic view of an embodiment of a machine as described herein for the additive manufacturing of three-dimensional objects for carrying out the methods disclosed herein.

FIG. 1 shows a schematic side view of an embodiment of a machine 1 for the additive manufacturing of a three-dimensional object 2 (or also a plurality of three-dimensional objects), also called a 3D printing machine.

The machine 1 includes a gas-tight processing chamber 3, which can be filled and/or flushed in a manner not shown with an inert gas (protective gas), such as nitrogen or a noble gas such as argon.

Connected to the processing chamber 3 is a powder cylinder arrangement 4 with a powder cylinder (storage cylinder) 5 for a powdery material 6 (shown with dots), from which the three-dimensional object 2 is manufactured here by sintering or melting. The powdery material 6 can, for example, include or consist of metal particles with an average grain size (D50) of 25-100 μm; in other applications, plastics material particles or ceramic particles of similar size can also be used. By gradually raising a powder piston 7 with a first lifting device (powder lifting device) 8, a small amount of the powdery material 6 is raised above the level of the bottom 9 of the processing chamber 3, so that using a motor-operated slider 10 this small amount can be brought to a construction cylinder arrangement 11.

The construction cylinder arrangement 11, which is also connected to the processing chamber 3, has the piston 12, on the top of which a base element 13, here a substrate 13a, is arranged. The three-dimensional object 2 is built on the base element 13. The base element 13 can be moved vertically with the piston 12 in a base body 14. The piston 12 is constructed in multiple parts and is provided with adjusting elements in order to be able to correct a tilting of the base element 13 in the construction cylinder arrangement 11 (not shown in more detail, but see FIG. 2).

Each time before the manufacturing of a new layer of the three-dimensional object 2, the piston 12 is lowered by one step using a second lifting device (lifting device) 15, and a small amount of the powdery material 6 is spread into the construction cylinder arrangement 11 with the slider 10. The applied layer of the powdery material 6 is checked with a camera 21 and a test device 28 connected to the camera (operating an image evaluation software); if necessary, the applied layer can be corrected with the slider 10 and/or with further powdery material 6. For example, a damaged slider 10 can be identified on the basis of a faulty powder application and subsequently exchanged in order to correct the applied layer. The camera 21 is preferably provided with a shifted optical system (not shown in detail). The camera 21 is arranged here behind a window 21a outside the processing chamber 3.

Then the newly applied powder layer is illuminated locally and thus locally strongly heated from above using a high-energy beam 16, here a machining laser beam 16a, from a high-energy beam source 17, here a machining laser 17a, at locations which are intended for local solidification (melting, sintering) of the powdery material 6.

The machining laser beam 16a is guided through a beam splitter 18 via a scanner optical system 19, containing one or more mirrors, which can be pivoted in total about at least two axes, via a focusing optical system 29 and through a window 20. The scanner optical system 19 and the focusing optical system 29 are located centrally above the base element 13 here. By means of the scanner optical system 19, the machining laser beam 16a can scan the base element 13 or the uppermost powder layer thereon in accordance with the intended shape of the three-dimensional object 2 ("machining pattern").

After that, further layers are manufactured until the three-dimensional object 2 is completed. Excess powdery material 6 can be spread with the slider 10 in a collection container 6a.

As described herein, the machine 1 has a measuring system 22 for measuring the base element 13, e.g., before the start of the manufacture process, in order to be able to detect any deformations (such as tilting) on the base element 13 and, if necessary, to correct them.

The measuring system 22 includes its own measuring laser 23, the laser beam 24 of which can be coupled via the beam splitter 18 into the scanner optical system 19 also used by the machining laser beam 16a or the beam path thereof, so that laser beams 24a of the measuring laser 23 deflected by the scanner optical system 19 can be directed at least onto parts of the base element 13 according to a measurement pattern. The deflected laser beams 24a spread downwards in the vertical direction or at a small angle (usually ≤30°, preferably 20°) with respect to the vertical. The scanner optical system 19 is connected to a control device 25, in which one or more measurement patterns or corresponding control commands for controlling the scanner optical system 19 for measuring the base element 13 are programmed.

The measuring system 22 also includes the camera 21, which is also used for checking the powder bed. The surface of the base element 13 can be recorded with the camera 21, so that the actual sites of incidence of the deflected laser beams 24a of the measuring laser 23 can be recorded in accordance with the measurement pattern. The camera 21 is connected to an evaluation device 26 with which the observed sites of incidence are evaluated and converted into measuring data about the base element 13, for example a tilt of the base element. Here, the evaluation device typically uses reference information ("target images"). These measuring data can then be used to correct the position or orientation of the base element 13, possibly also iteratively.

The camera 21 is offset from the base element 13 in the horizontal direction, cf. offset 27 (shown here between the edge of the base element 13 and the center of the camera lens of the camera 21; note that in practice the camera lens is usually much smaller than the offset 27). It is thereby achieved that the camera 21 "looks at" the deflected laser beams 24a at an angle (usually >20°).

Figure 2:
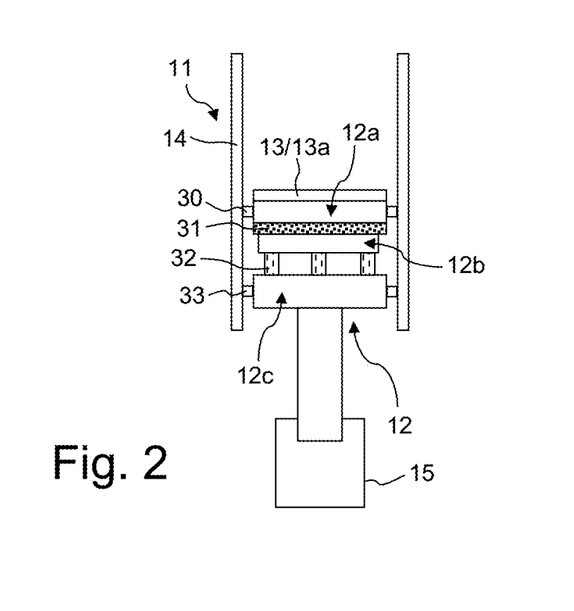
FIG. 2 is a schematic longitudinal section of a construction cylinder arrangement.

FIG. 2 shows a construction cylinder arrangement 11, such as can be used in the machine of FIG. 1, in a schematic longitudinal sectional view.

In the approximately cylindrical base body 14, the piston 12 can be moved along the vertical cylinder axis with the second lifting device 15.

The piston 12 has an upper piston part 12a on which the base element 13, here a substrate 13a, is arranged and fastened on the upper side. The upper piston part 12 has a powder seal 30, with which a gap to the base body 14 is closed, so that powdery material cannot penetrate, or can penetrate only in very small quantities, further downward into the construction cylinder arrangement 11. The upper piston part 12a typically has a heater with which the base element 13 and powdery material located thereon can be heated (not shown in more detail).

The upper piston part 12a is arranged on a middle piston part 12b, a ceramic insulation plate 31 being arranged between the upper piston part 12a and the middle piston part 12b.

The middle piston part 12b is mounted here on a lower piston part 12c via three adjusting elements 32. The adjusting elements 32 can for example be designed as piezo actuators. The adjusting elements 32 allow to set a tilting of the middle piston part 12b (and thus also the upper piston part 12a) with respect to the lower piston part 12c relative to two horizontal axes. The lower piston part 12c has a gas seal 33, which seals the gap to the base body 14 and prevents the penetration of atmospheric oxygen into the interior of the construction cylinder arrangement 11 during the manufacturing of a three-dimensional object. The lower piston part 12c typically has cooling (not shown in more detail).

Figure 3:
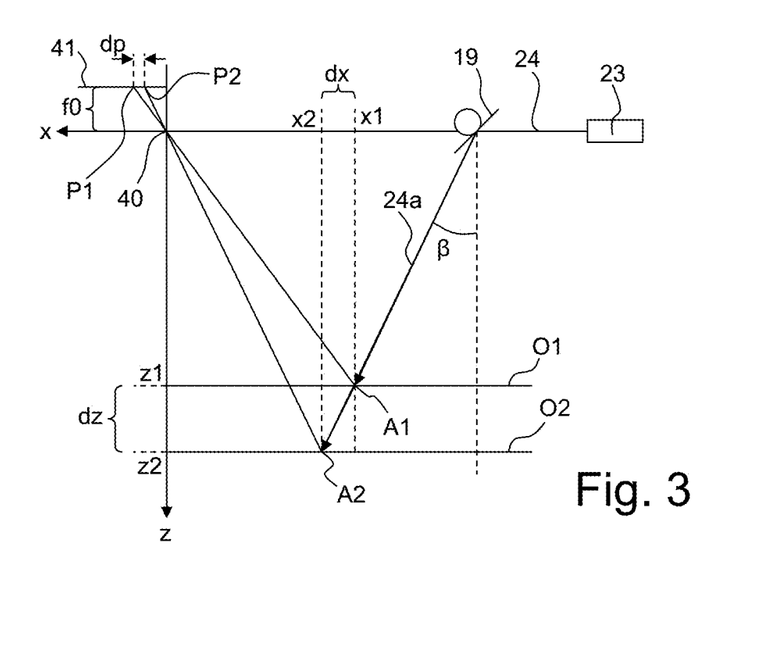
FIG. 3 is an illustration of a triangulation measurement.

FIG. 3 explains the principle of measuring a base element, for example determining the local height position of a part of the base element, within the scope of the present disclosure. The base element is measured, e.g., by means of triangulation. Thereby, a measurement pattern is projected onto the base element, the target position of the measurement pattern (or the sites of incidence of the laser beam) on the base element being known on the basis of the scanner optical system control and the (target) geometry of the base element, and position or orientation information is obtained from the deviation of the actual, current measurement pattern (or the sites of incidence of the laser beam) on the base element, monitored, e.g., observed or imaged, by a laterally offset camera.

The laser beam 24 of the measuring laser 23 is deflected at the scanner optical system 19, cf. the deflected laser beam 24a. The deflected laser beam 24a has an angle β with respect to the vertical which is parallel to a z-axis; typically β is in a range of +/−30° or less, or +/−20° or less.

The deflected laser beam 24a strikes a surface O1 of the base element at a site of incidence A1. A camera, with the camera lens 40 which is laterally offset in the horizontal x-direction, observes the site of incidence A1. The site of incidence A1 is imaged as the site of projection P1 on a camera sensor 41 or a corresponding image plane.

If the surface of the base element is lower in the vertical z-direction by the height difference dz (cf. the surface O2), the camera, on the other hand, recognizes the site of incidence A2, which strikes the camera sensor 41 at the site of projection P2. The sites of projection P1 and P2 differ by the projection offset dp in the x direction.

The site of projection $P_1$ on the camera sensor 41 can be used as a reference variable for which the height position z1 of the site of incidence A1 is known. By means of the projection offset dp of the site of projection P2 relative to the site of projection P1 (with knowledge of the angle β and the focal length f0 of the camera lens 40), the height position z2 of the site of incidence A2 can then be easily determined using the laws of geometric optics. If desired, the horizontal position x2 of the site of incidence A2 can be determined correspondingly if the horizontal position x1 of the site of incidence A1 is known.

Figure 4:
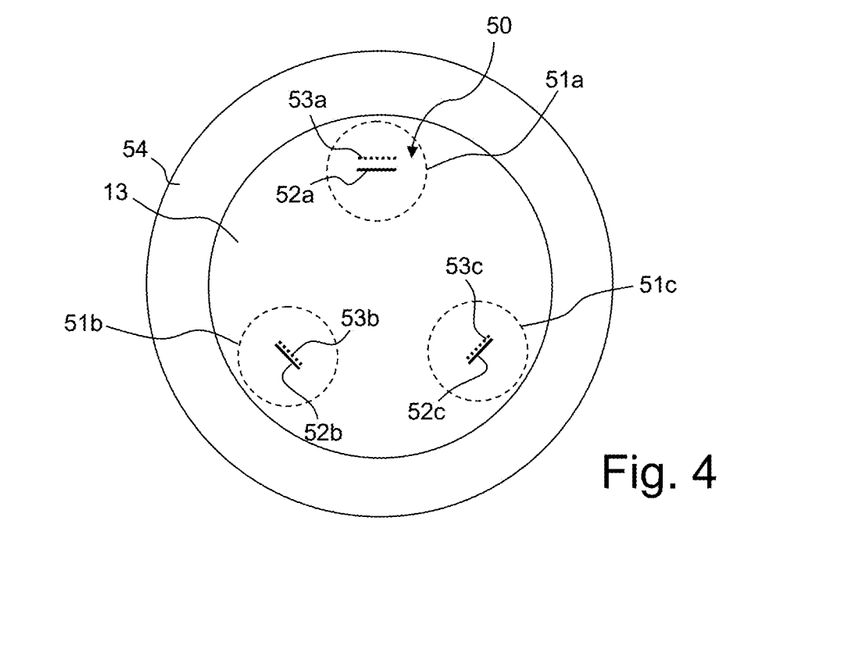
FIG. 4 is a schematic plan view of a base element, to which a measurement pattern is directed, without tilting and with tilting of the base element, as used in the methods described herein.

To determine the tilt of a base element 13, a measurement pattern 50 typically comprises illumination of the base element 13 in three different zones 51a, 51b, 51c, as can be seen in the top view of the base element 13 in FIG. 4. The measurement pattern 50 here includes a laser line 52a, 52b, 52c (shown in solid lines) in each zone 51a, 51b, 51c (shown in dashed lines); each laser line 52a, 52b, 52c consists of a multiplicity of laser points (not resolved in FIG. 4). The laser lines 52a-52c are generated here by a measuring laser and scanner optical system centrally above the base element 13 (not shown).

If the base element 13 is tilted, for example with the upper section in FIG. 4 down into the plane of the drawing, the laser lines shift on the surface of the base element, cf. the dashed laser lines 53a, 53b, 53c, which can be easily detected with a laterally offset camera (not shown). A separate local height position of the base element 13 can be determined for each of the zones 51a, 51b, 51c; typically, height position information of the different laser points of a respective laser line is averaged. The tilting of the base element 13 results from the three local height positions.

Adjusting elements (not shown) for adjusting the orientation of the base element 13 relative to a fixed reference structure 54, which is for example part of the bottom of the processing chamber, are preferably located directly under the zones 51a, 51b, 51c.

Figure 5:
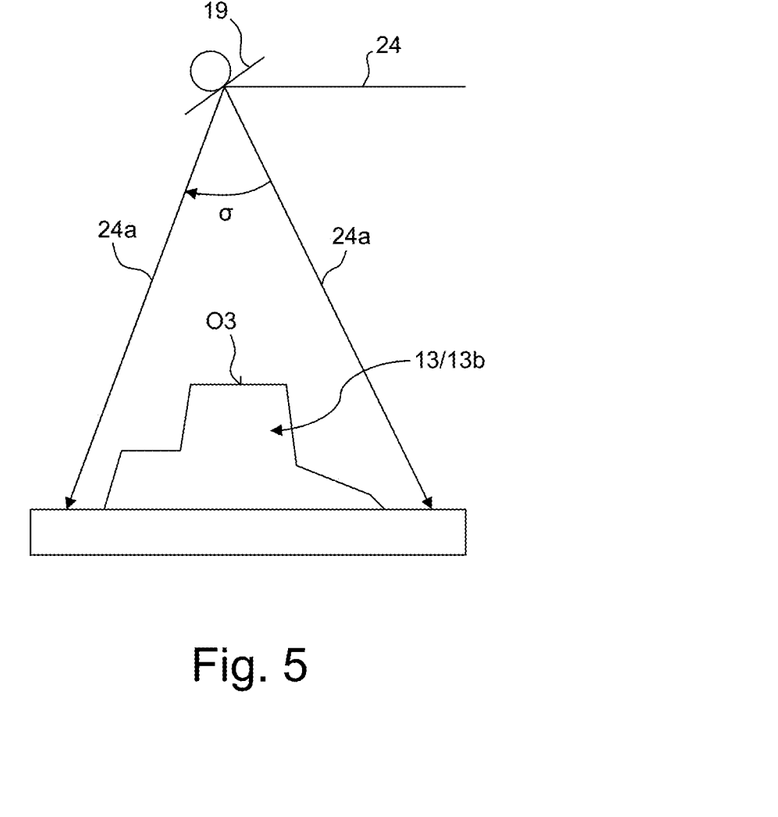
FIG. 5 is a schematic side view when scanning a preform line by line, as disclosed herein.

FIG. 5 schematically illustrates the measurement of a base element 13, which is designed as a preform 13b. The preform 13b already has a complex three-dimensional shape on which the actual three-dimensional object (not shown) to be manufactured in an additive manner is to be built. Before the manufacturing of the three-dimensional object begins, the surface (contour) O3 of the preform 13b can be scanned (limited by any shadowing) using deflected laser beams 24a, which are generated from the laser beam 24 of a measuring laser with the scanner optical system 19. FIG. 5 shows the scanning of a line of the preform 13b in an angular range α; the entire measurement comprises further lines in front of and behind the drawing plane of FIG. 5, for each of which a separate image recording is carried out.

Figure 6:
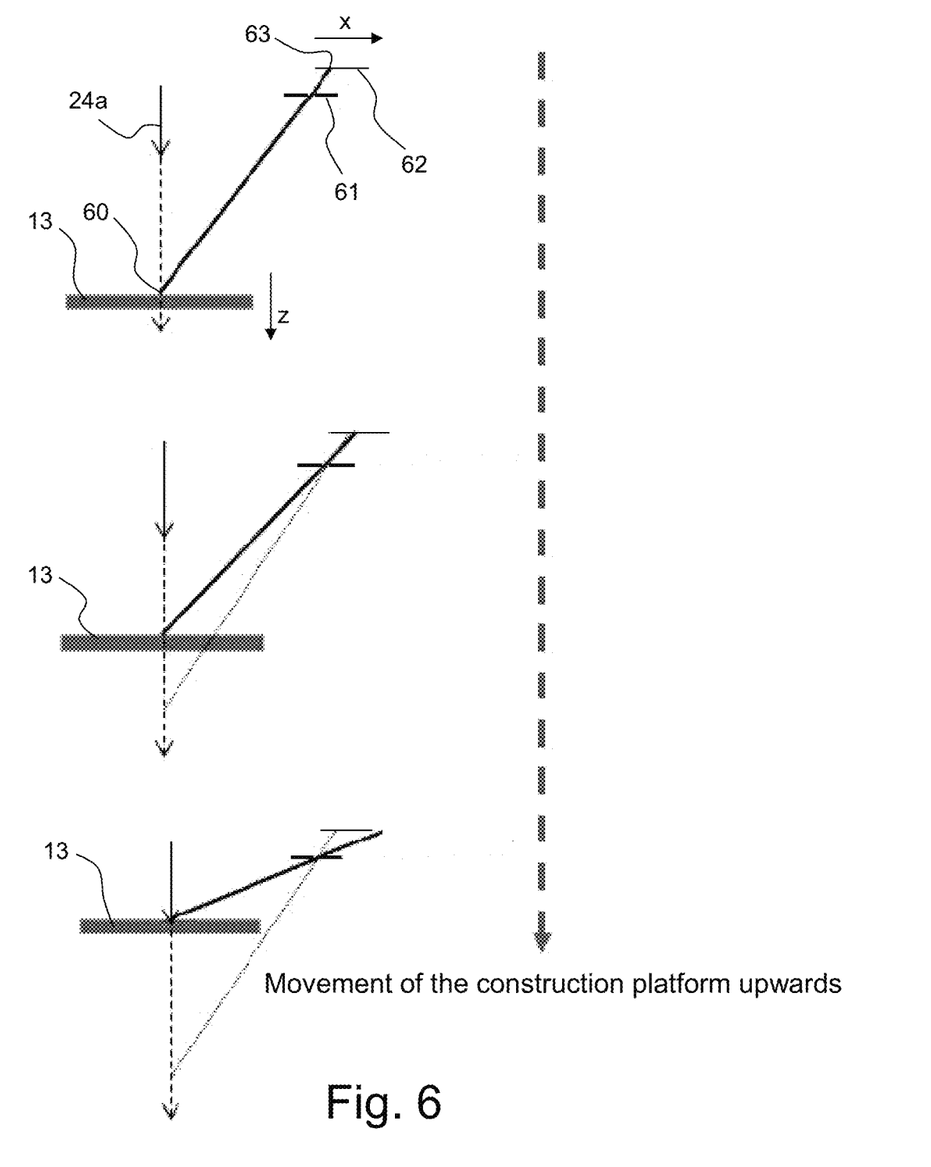
FIG. 6 is a schematic overview for the detection of a triangulation point of a measurement pattern, with different travel positions of a base element.

The method according to the present disclosure can also be used to calibrate a measuring system. For this purpose, FIG. 6 illustrates, by way of example, a simple measurement setup (cf. upper partial image) with a base element 13, which can be moved along a (here vertical) direction of travel (z-direction). A deflected laser beam 24a of a measuring laser creates a so-called triangulation point 60 on the base element 13, corresponding to a site of incidence of the laser beam 24a on the surface of the base element 13. The camera 21, here comprising a lens 61, which simultaneously forms an entrance pupil of the camera 21, and a CMOS sensor 62, captures an image 63 of the triangulation point on the CMOS sensor 62. Depending on the travel position z of the base element 13, there is a different site of incidence, also called position signal x, from the image 63 of the triangulation point on the CMOS sensor 62. Depending on the travel position z of the base element 13, the position signal x obeys a hyperbolic curve, with $x=P_0/(P_1+z)+P_2$, with $P_0$, $P_1$, $P_2$: Hyperbolic parameters. The position signal x diverges on the CMOS sensor 62 when the base element 13 reaches the height of the entrance pupil or here the lens 61, regardless of the angle of the laser beam 24a with respect to the vertical or the direction of travel (z direction). This can be used for a calibration (cf. FIG. 11).

FIG. 6 shows, by way of example, three different travel positions of the base element 13, which is designed here as a construction platform; the base element 13 is moved upward in the partial images from top to bottom. As described herein, position signals x at different travel positions z of a reference base element or of the base element are measured both in a reference measurement sequence and in later measurement sequences for individual construction jobs.

It should be noted that in FIG. 6 the laser beam is directed parallel to the (vertical) direction of travel of the base element 13, which represents a possible design. However, it is preferred that the laser beam 24a extends obliquely to the direction of travel z, that is to say with an angle β>0°, as shown, for example, in FIG. 3, preferably with β≥5°. Then, speckle errors can be minimized.

Figure 7:
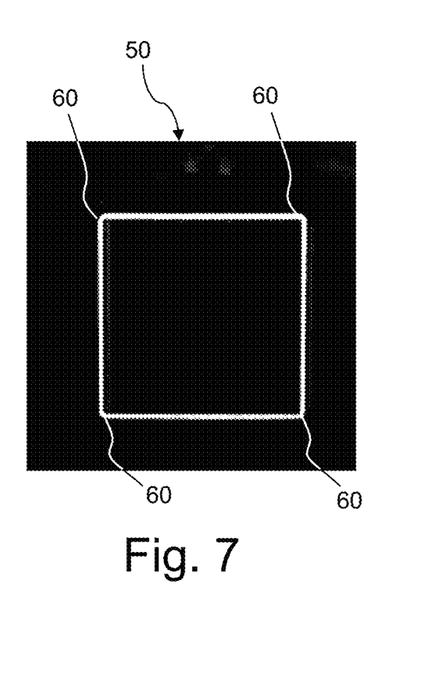
FIG. 7 is a schematic overview of a measurement pattern for four triangulation points.
Figure 8:
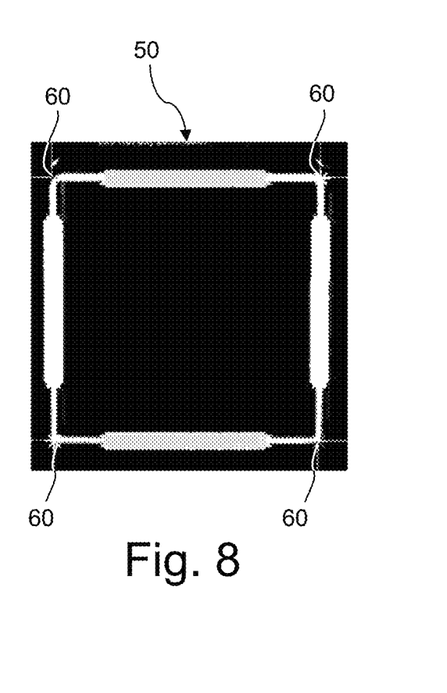
FIG. 8 is a schematic overview of the image recognition in the measurement pattern from FIG. 7.

FIG. 7 shows, by way of example, a measurement pattern 50 in the shape of the edges of a rectangle, on which four triangulation points 60 are formed at the corners of a the rectangle; typically all triangulation points 60 are considered separately in the scope of (reference) measurement sequences. The straight portions of the rectangle can be easily recognized by image recognition software, cf. FIG. 8, in which the recognized straight sections are marked in bold, so that the position of the corner points or triangulation points 60 can easily be determined by extrapolation.

Figure 9:
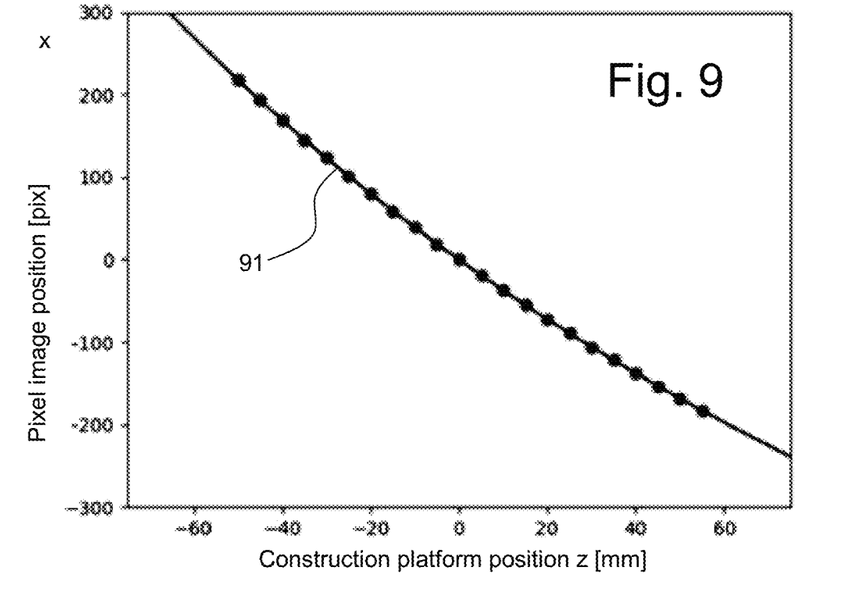
FIG. 9 is a graph that illustrates a set of reference measurement sequence data.

FIG. 9 is a graph that illustrates the raw data (drawn in as circles) of a reference measurement sequence, in which the position signal (x), i.e. the location of the image of a triangulation point (plotted upwards), is shown as a function of the travel position (z) of the reference base element (plotted to the right). The individual measurement points lie on a fitted hyperbolic curve 91, which is drawn in as a solid line. The behavior of the reference base element is described by the fitted hyperbolic curve 91 (or another fitted curve, for example a polynomial curve), and speckle errors are averaged out.

The location (with respect to z) of a pole point ($z_P^R$) of the hyperbolic curve, which represents the location of the entrance pupil of the camera, can also be determined from the fitted hyperbolic curve 91. The pole point lies outside the measured area and is determined by calculation from the hyperbolic parameter $P_1$ of the fitted hyperbola (cf. FIG. 11 for this).

Figure 10:
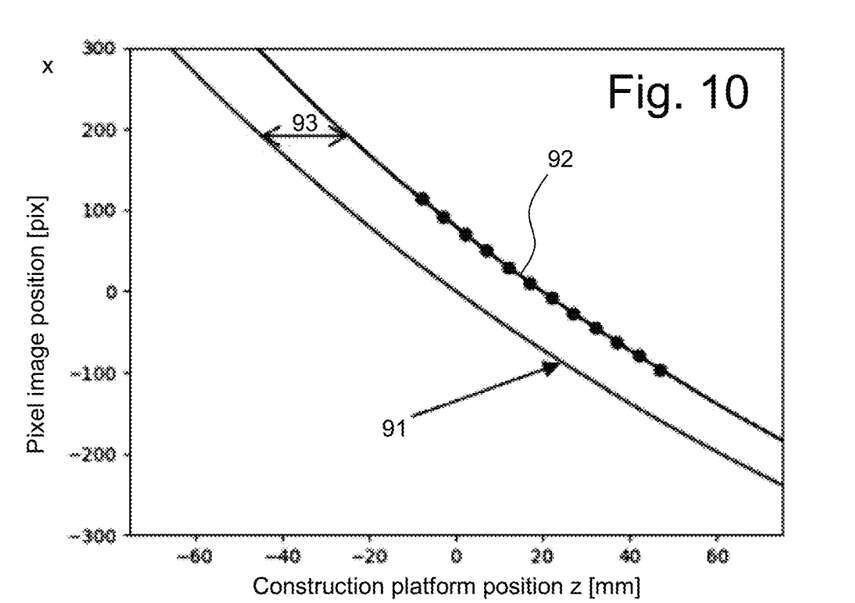
FIG. 10 is a graph that illustrates a set of measurement sequence data and a fit curve of the reference measurement sequence data of FIG. 9, for a calibration via a curve offset.

FIG. 10 is a graph that shows the raw data of a measurement sequence (drawn in as circles), again with position signal x (upwards) against the travel position (z) of the base element (to the right). A hyperbolic curve 92 (or another curve) can again be fitted to these measuring points. In addition, the hyperbolic curve 91 of the reference measurement sequence is shown again.

If it is ensured that the reference angle and the angle at which the laser beam was directed onto the reference base element or base element were practically identical for the reference measurement sequence and the measurement sequence, a height difference between the reference base element that was used in the reference measurement sequence and the base element that was used in the measurement sequence can be directly concluded from an offset 93 of the fitted curves 91, 92. Such a height difference can result, for example, from the manufacturing tolerances of construction platforms, or from thermal expansion, or simply from different types of construction platforms. This determined height difference can be taken into account as a correction term for setting the travel position of the base element in the subsequent additive manufacturing of a three-dimensional object. In the present case, under the boundary conditions of the measurement sequence (cf. hyperbolic curve 92), the travel position z must be set lower by the offset 93 in order to obtain the positions of the surface of the base element (relative to the camera) in accordance with the boundary conditions of the reference measurement sequence. The offset 93 can be determined relatively precisely even with comparatively small travel paths in the z direction.

If it cannot or should not be assumed that the reference angle and angle are identical, in particular for a higher calibration accuracy, the position of the pole point ($z_P^M$) can also be determined for the fitted hyperbolic curve 92 of the measuring points of the measurement sequence. The pole point is again outside the measured area of FIG. 10 and is determined by calculation from the hyperbolic parameter $P_1$ of the fitted hyperbolic curve 92 (cf. FIG. 11).

Figure 11:
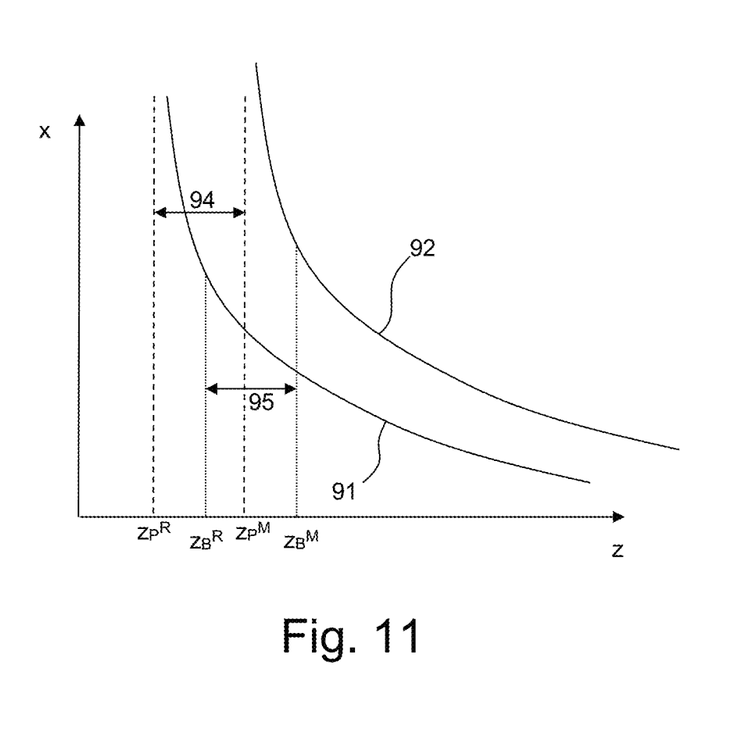
FIG. 11 is a graph that schematically illustrates calibration via the offset of pole points, based on fitted hyperbolic curves as shown in FIG. 10 and FIG. 11.

FIG. 11 is a graph that schematically shows the hyperbolic curve 91 of the reference measurement sequence and the hyperbolic curve 92 of the measurement sequence in a larger area, in particular also in the area of the pole points. The position of the pole points of the reference measurement sequence and measurement sequence are independent of the reference angle and angle of the laser beam in the reference measurement sequence and the measurement sequence, and each corresponds to the (always the same) location of the entrance pupil of the camera, for example, the lens thereof. By comparing the pole point positions, the measuring system can also be calibrated, regardless of interfering influences such as pointing instabilities of the laser. A desired z position of the surface of a base element that was reached in the reference measurement sequence (with a reference base element) at a travel position $z_B^R$, wherein the pole point was determined in the reference measurement sequence at $z_P^R$ and the pole point was determined in the measurement sequence at $z_P^M$, can be obtained (with the boundary conditions of the measurement sequence) by setting a travel position $z_B^M = z_P^M + (z_B^R - z_P^R) = z_B^R + (z_P^M - z_P^R)$. The difference 94 of the pole point positions can therefore be used as the correction term 95.

Other Embodiments

It is to be understood that while the new methods, machines, and systems disclosed herein have been described in conjunction with the detailed description thereof, the foregoing description is intended to illustrate and not limit the scope of the machines, methods, and systems disclosed herein, which are defined by the scope of the appended claims. Other aspects, advantages, and modifications are within the scope of the following claims.

LIST OF REFERENCE NUMERALS

1 machine
2 three-dimensional object
3 processing chamber
4 powder cylinder arrangement
5 powder cylinder
6 powdery material
6a collection container
7 powder piston
8 first lifting device
9 bottom
10 slider
11 construction cylinder arrangement
12 piston of the construction cylinder arrangement
12a upper piston part
12b middle piston part
12c lower piston part
13 base element
13a substrate
13b preform
14 base body
15 second lifting device
16 high-energy beam
16a machining laser beam
17 high-energy beam source
17a machining laser
18 beam splitter
19 scanner optical system
20 window of the scanner optical system
21 camera
21a window of the camera
22 measuring system
23 measuring laser
24 laser beam from the measuring laser
24a deflected laser beam of the measuring laser
25 control device
26 evaluation device
27 offset
28 test device
29 focusing optical system
30 powder seal
31 insulation plate
32 adjusting element
33 gas seal
40 camera lens
41 camera sensor
50 measurement pattern
51a-51c zones 52a-52c laser lines with the base element not tilted
53a-53c laser lines with tilted base element
54 reference structure
60 triangulation point
61 lens
62 CMOS sensor
63 image of the triangulation point
91 hyperbolic curve (measurement sequence)
92 hyperbolic curve (reference measurement sequence)
93 offset
94 difference in pole point positions
95 correction term
A1, A2 sites of incidence
dx horizontal offset
dp projection offset
dz height offset
f0 focal length
O1-O3 surface of the base element
P1, P2 sites of projection
$P_0$, $P_1$; $P_2$ hyperbolic parameters
x horizontal direction/position signal
x1, x2 horizontal positions
z vertical direction/direction of travel
z1, z2 height positions
$z_B^M$ desired z position of the base element in the measurement sequence
$z_B^R$ desired z position of the base element in the reference measurement sequence
$z_P^M$ z position of the pole point in the measurement sequence
$z_P^R$ z position of the pole point in the reference measurement sequence
β angle of the deflected laser beam relative to the vertical
σ angular range of the deflected laser beams of a scanning line

What is claimed is:

1. A method for measuring a base element of a construction cylinder arrangement, wherein
the construction cylinder arrangement including a base element, a piston, and a substantially cylindrical base body, is arranged on a machine for additive manufacturing of three-dimensional objects by sintering or melting a powdery material using a high-energy beam, and
the base element can be moved by the piston in the substantially cylindrical base body of the construction cylinder arrangement,
the method comprising
producing a measurement pattern from laser light that illuminates at least part of the base element, wherein the measurement pattern is produced by deflection of a laser beam of a measuring laser by a scanner optical system such that differently deflected laser beams are produced and the deflected laser beams are oriented at least towards the part of the base element;
illuminating the base element with the laser light; and
monitoring sites of incidence of the laser light on the base element with a camera to produce measuring data about the base element, wherein the measuring data comprises information about a three-dimensional shape of at least a part of a surface of the base element and one or both of position information and orientation information,
wherein the camera is arranged in a laterally offset manner in relation to the deflected laser beams, and
wherein the measurement pattern is used to determine at least the three-dimensional shape of at least the part of the surface of the base element.

2. The method of claim 1, wherein the piston has an upper piston part, on which the base element is arranged, and a lower piston part, against which the upper piston part can be aligned by at least two adjusting elements.

3. The method of claim 2, wherein the measurement pattern is produced by illuminating at least a part of the base element in three different zones.

4. The method of claim 3, wherein locations of at least two of the three different zones substantially correspond to locations of the at least two adjusting elements with which the base element can be tilted with respect to a reference structure.

5. The method of claim 3, wherein the measurement pattern in each of the three zones comprises a plurality of laser points.

6. The method of claim 1, wherein measuring the base element further provides information relating to a tilting of the base element relative to a reference structure.

7. The method of claim 1, wherein the measurement pattern comprises a line-by-line scan of at least the part of the surface of the base element, wherein a plurality of individual images are taken with the camera during the line-by-line scan.

8. The method of claim 1, wherein the measurement pattern is further used to determine a height of the base element relative to a reference structure.

9. The method of claim 1, further comprising comparing the sites of incidence of the laser light on the base element monitored with the camera with expected sites of incidence of the laser light on the base element for measuring the base element.

10. The method of claim 9, wherein the measurement pattern illuminates only the base element or wherein only sites of incidence of the laser light on the base element are evaluated, or both.

11. The method of claim 1, wherein the machine further comprises a machining laser, and after the measuring of the base element, then for manufacturing layers of at least one three-dimensional object on the base element, at least parts of layers of powdery material on the base element are illuminated with machining patterns made of laser light, wherein the machining patterns are generated by deflecting a laser beam of the machining laser by the scanner optical system.

12. The method of claim 1, wherein after the measuring of the base element then layers of powdery material are applied on the base element for manufacturing layers of at least one three-dimensional object on the base element, wherein the layers of powdery material are optically checked with the camera before the high-energy beam is used.

13. The method of claim 1, wherein
the measurement pattern comprises at least one triangulation point,
in a measurement sequence sites of incidence of the at least one triangulation point are monitored at different travel positions of the base element in the base body using the camera and associated measurement sequence data are obtained, wherein the triangulation point is generated by a deflected laser beam which is directed at the base element at a fixed angle during the measurement sequence,
the measurement sequence data are compared with reference measurement sequence data from a reference measurement sequence, wherein the sites of incidence of the at least one triangulation point were also monitored within a scope of the reference measurement sequence at different travel positions of a reference base element in the base body using the camera and the associated reference measurement sequence data were obtained, wherein the triangulation point was generated by a deflected laser beam, which was directed at the reference base element at a reference angle fixed during the reference measurement sequence, and correction information for the measuring of the base element is derived from the comparison of the measurement sequence data and the reference measurement sequence data.

14. The method of claim 13, wherein the measurement pattern comprises at least three triangulation points, and the triangulation points are formed as corner points of the measurement pattern, to which straight portions of the measurement pattern adjoin.

15. The method of claim 13, wherein one or more curve parameters are each determined from the measurement sequence data and the reference measurement sequence data, which in each case describe a fitted curve, which is fitted to the sites of incidence monitored as a function of the travel position of the base element in the base body.

16. The method of claim 15, wherein the correction information is determined from an offset of the curves of the measurement sequence data and the reference measurement sequence data.

17. The method of claim 15, wherein each fitted curve is a hyperbolic curve and the curve parameters are hyperbolic parameters, a position of a pole point of the fitted hyperbolic curve is determined from the one or more hyperbolic parameters, and the correction information is determined from a comparison of the positions determined of the pole points of the fitted hyperbolic curve of the measurement sequence data and the reference measurement sequence data.

18. The method of claim 13, wherein the fixed angle extends obliquely to a direction of travel of the base element in the base body.

* * * * *